United States Patent
Sato et al.

(10) Patent No.: US 11,363,241 B2
(45) Date of Patent: Jun. 14, 2022

(54) SURVEILLANCE APPARATUS, SURVEILLANCE METHOD, AND STORAGE MEDIUM

(71) Applicant: CANON KABUSHIKI KAISHA, Tokyo (JP)

(72) Inventors: Shunsuke Sato, Kawasaki (JP); Hirotaka Hachiya, Wakayama (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/675,090

(22) Filed: Nov. 5, 2019

(65) Prior Publication Data

US 2020/0077050 A1 Mar. 5, 2020

Related U.S. Application Data

(63) Continuation of application No. PCT/JP2018/017478, filed on May 2, 2018.

(30) Foreign Application Priority Data

May 9, 2017 (JP) .............................. JP2017-093337

(51) Int. Cl.
*H04N 7/18* (2006.01)
*G06T 7/70* (2017.01)
*G06V 20/52* (2022.01)

(52) U.S. Cl.
CPC ............. *H04N 7/18* (2013.01); *G06T 7/70* (2017.01); *G06V 20/52* (2022.01); *G06T 2207/30232* (2013.01)

(58) Field of Classification Search
CPC ............ G06T 2207/30232; G06T 7/70; G08B 13/196; G08B 25/00; G08B 25/04; H04N 5/915; H04N 5/93; H04N 7/18
See application file for complete search history.

(56) References Cited

U.S. PATENT DOCUMENTS

2006/0077256 A1* 4/2006 Silvemail ......... G08B 13/19647
    348/143
2012/0194342 A1* 8/2012 Reinpoldt .............. G16H 50/80
    340/573.1

(Continued)

FOREIGN PATENT DOCUMENTS

CN  103067692 A  4/2013
CN  106488181 A  3/2017

(Continued)

OTHER PUBLICATIONS

Saligrama, Venkatesh, et al., Video Anomaly Detection Based on Local Statistical Aggregates, 2012 IEEE Conference on Computer Vision and Pattern Recognition, 8 pages.

(Continued)

*Primary Examiner* — Md N Haque
(74) *Attorney, Agent, or Firm* — Canon U.S.A., Inc. IP Division

(57) ABSTRACT

An apparatus acquires a video image from a surveillance camera 2 and displays an image based on the video image on a display 3. The apparatus 1 records the video image acquired from the surveillance camera 2 in a recording unit 105. The apparatus 1 includes an abnormality detection unit 106 configured to detect an abnormality from the video image, an attention period determination unit 107 configured to determine an attention period based on a period from a start to an end of a detected abnormality, and a displaying unit 102 configured to display a video image acquired from the surveillance camera 2 as it is on a display 3 until the abnormality being detected ends, and, when the abnormality being detected ends, acquire, from a recording unit 105, a recorded video image recorded in a period corresponding to the attention period and play back the acquired recorded video image.

15 Claims, 11 Drawing Sheets

(56) References Cited

U.S. PATENT DOCUMENTS

2017/0064196 A1* 3/2017 Ura .......................... G09G 5/14
2018/0004907 A1* 1/2018 Koezuka .................. A61B 5/18

FOREIGN PATENT DOCUMENTS

| JP | H10294933 A | | 11/1998 |
|---|---|---|---|
| JP | 2001231028 A | | 8/2001 |
| JP | 2005086403 A | | 3/2005 |
| JP | 2005128967 A | | 5/2005 |
| JP | 2006019845 A | | 1/2006 |
| JP | 2008054243 A | | 3/2008 |
| JP | 2008271349 A | | 11/2008 |
| JP | 2011014658 A | * | 1/2011 |
| JP | 2012014543 A | | 1/2012 |
| JP | 2013210989 A | | 10/2013 |
| JP | 2017028688 A | | 2/2017 |

OTHER PUBLICATIONS

Loyu, Chen Change, et al., Detecting and discriminating behavioural anomalies, Pattern Recognition, No. 44, 2011, pp. 117-132, Elsevier Ltd.
N. Kiryati, et al., Real Time Abnormal Motion Detection in Surveillance Video, 2008 19th International Conference or Pattern Recognition, 2008, 21 pages.
Wu Xinyu, et al., Survey on the video-based abnormal event detection in crowd scenes, Journal of electronic Measurement and Instrumentation, Jun. 2014, pp. 575-584, vol. 28, No. 6, 10 pages.

* cited by examiner

| FRAME | WIDTH | HEIGHT | CENTER COORDINATES | HEAD POSITION | ABNORMALITY DEGREE | ESTIMATED ABNORMALITY TYPE |
|---|---|---|---|---|---|---|
| 401 | 100 | 400 | 350,450 | 403 | 65 | VIOLENCE AGAINST SOMEONE |
| 402 | 70 | 360 | 550,420 | 404 | 43 | VIOLENCE FROM SOMEONE |

SURVEILLANCE APPARATUS, SURVEILLANCE METHOD, AND STORAGE MEDIUM

CROSS-REFERENCE TO RELATED APPLICATIONS

This application is a Continuation of International Patent Application No. PCT/JP2018/017478, filed May 2, 2018, which claims the benefit of Japanese Patent Application No. 2017-093337, filed May 9, 2017, both of which are hereby incorporated by reference herein in their entirety.

TECHNICAL FIELD

The present invention relates to a surveillance apparatus using a surveillance camera and a method therefor.

BACKGROUND ART

Some recent remote surveillance systems have a function of automatically switching a mode of displaying a video image when an event such as an abnormality or change occurs in the video image captured by a surveillance camera thereby preventing oversight by an observer. Japanese Patent Laid-Open No. 2012-14543 discloses a surveillance apparatus configured to cyclically display images captured by a plurality of surveillance cameras. In this surveillance apparatus, in a case where an abnormality is detected from a video image captured by a certain camera, then, at a next cyclic timing of displaying a video image captured by this camera, a recorded video image captured in a period in which the abnormality occurred is played back. Japanese Patent Application Laid-Open No. 2008-54243 discloses a surveillance apparatus configured such that when an abnormality is detected from a video image captured by one of a plurality of surveillance cameras, all displayed images assigned to the respective surveillance cameras are switched to the video image captured by the surveillance camera that has detected the abnormality. When the abnormality being detected ends, the surveillance system ends the mode of displaying the image captured by the surveillance camera that has detected the abnormality.

SUMMARY OF INVENTION

In the surveillance apparatus disclosed in Japanese Patent Laid-Open No. 2012-14543, in a case where an abnormality continues for a period longer than a cycle of the cyclic switching of displaying, the displayed image is switched to a recorded image even though the actual abnormality still continues. This may make it difficult for the observer to correctly grasp the current situation. In the surveillance apparatus disclosed in Japanese Patent Laid-Open No. 2008-54243, in a case where an abnormality ends in a very short time on a video image, the displaying mode returns to a normal mode in a short time, and thus there is a possibility that the observer may overlook the occurrence of the abnormality.

In view of the above, a main object of the present invention is to provide a surveillance apparatus that enables an observer to correctly recognize an abnormality.

According to the present invention, a surveillance apparatus includes an acquisition unit configured to acquire a video image captured by an image capturing apparatus, a display unit configured to display an image based on the video image on a display apparatus, a recording unit configured to record the video image, a detecting unit configured to detect an abnormality from the video image, a determination unit configured to determine an attention period based on a period from a start to an end of the abnormality detected by the detecting unit, and a control unit configured to control the displaying unit such that the video image acquired by the acquisition unit is displayed, as the video image is, by the displaying unit until the detection of the abnormality ends, while when the detection of the abnormality ends, a recorded video image recorded in the attention period is acquired from the recording unit and played back by the displaying unit.

Further features of the present invention will become apparent from the following description of exemplary embodiments with reference to the attached drawings.

DESCRIPTION OF EMBODIMENTS

Embodiments are described in detail below with reference to drawings.

First Embodiment

Figure 1A:
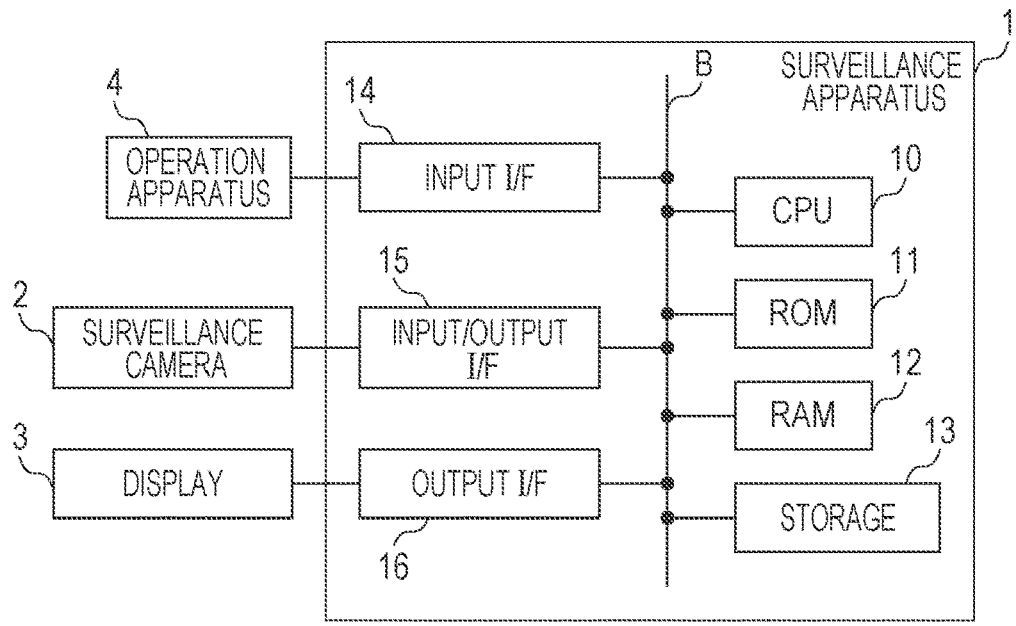
FIG. 1A is a diagram illustrating an example of a configuration of a surveillance system.
Figure 1B:
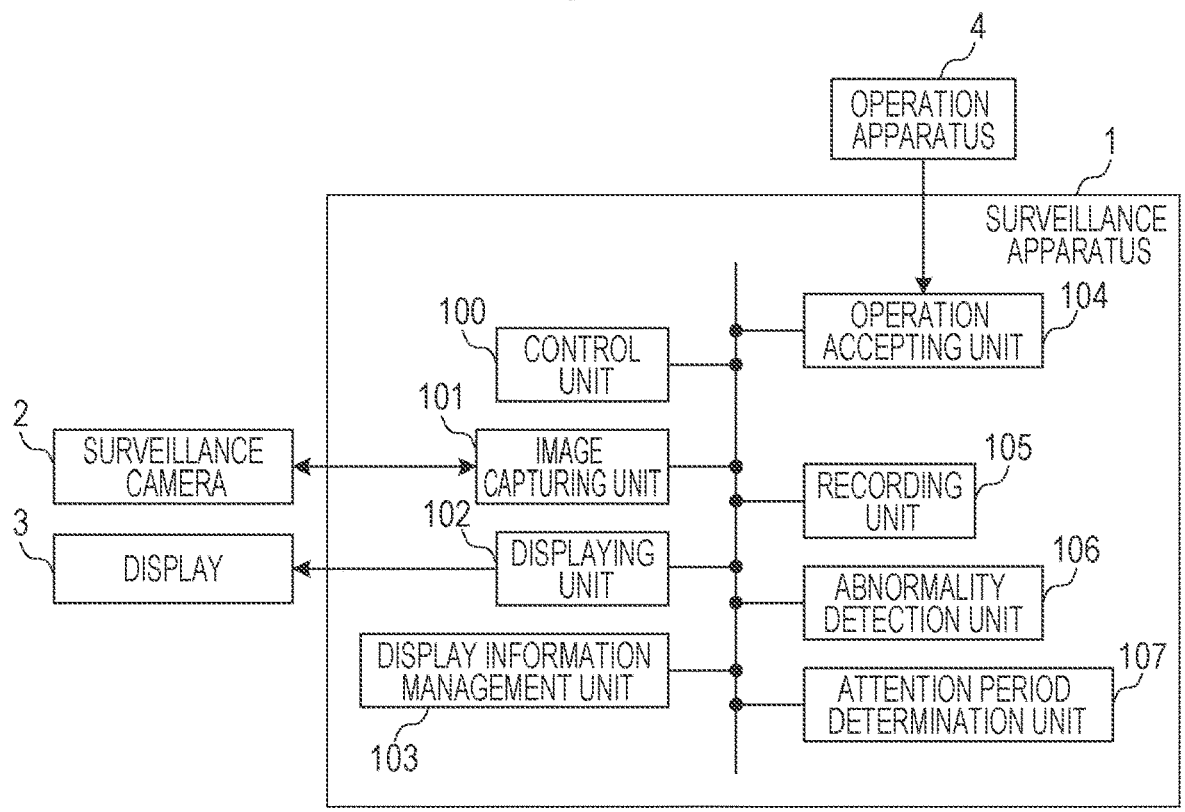
FIG. 1B is a diagram illustrating an example of a configuration of a surveillance system.

FIG. 1 is a diagram illustrating an example of a configuration of a surveillance system including a surveillance apparatus according to a first embodiment. FIG. 1A is a diagram illustrating a hardware configuration of the surveillance system, and FIG. 1B is a diagram illustrating a functional block of the surveillance apparatus. The surveillance system includes a surveillance apparatus 1, one or more surveillance cameras (image capturing apparatuses) 2, a display (display apparatus) 3, and an operation apparatus 4. The one or more surveillance cameras 2 are disposed at various locations in surveillance areas in a building, a site, or the like such that each surveillance camera 2 captures a video image in an image-capturing area. The display 3 displays an image based on a video image captured by each surveillance camera 2. The operation apparatus 4 is a user interface of the surveillance apparatus 1. In the first embodiment, a description is given for a case where there is one surveillance camera 2. However, the processing can be performed in a similar manner also when a plurality of surveillance cameras are provided.

The surveillance apparatus 1 acquires a video image from the surveillance camera 2 and displays it on the display 3. The surveillance apparatus 1 accepts an instruction from a user via the operation apparatus 4. Such a surveillance apparatus 1 may be realized using a computer including a CPU (Central Processing Unit) 10, a ROM (Read Only Memory) 11, and a RAM (Random Access Memory) 12. The CPU 10 reads a computer program from the ROM 11 and executes it using the RAM 12 as a work area, thereby controlling the operation of the entire surveillance system. The CPU 10, the ROM 11, and the RAM 12 transmit and receive data via a bus B. A storage 13, an input interface (I/F) 14, an input/output interface (I/F) 15, and an output interface 16 (I/F) are connected to the bus B. The storage 13 is a large-capacity storage apparatus, and records a video image acquired via the surveillance camera 2. The input I/F 14 accepts an instruction or the like from the operation apparatus 4 and transfers it to the CPU 10. The input/output I/F 15 is connected to the surveillance camera 2, and controls the operation of the surveillance camera 2 under the control of the CPU 10 and acquires a video image captured by the surveillance camera 2. The output I/F 16 is connected to the display 3 and displays an image on the display 3 under the control of the CPU 10.

The surveillance apparatus 1 has functional blocks functioning as a control unit 100, the image capturing unit 101, a displaying unit 102, a display information management unit 103, an operation accepting unit 104, a recording unit 105, an abnormality detection unit 106, and an attention period determination unit 107. These functional blocks may be realized by executing a computer program by the CPU 10. Note that at least part of the functional blocks may be realized by hardware.

The control unit 100 controls the operation of each functional block. The image capturing unit 101 controls an image sensing device, an imaging lens, an operation of a driving motor and the like of the surveillance camera 2 so as to capture an image within an image-capture area (a surveillance area). The image capturing unit 101 acquires a video image captured by the surveillance camera 2. The displaying unit 102 controls the display 3 to display an image based on the video image acquired by the image capturing unit 101 from the surveillance camera 2. The display information management unit 103 generates an image to be displayed on the display 3 under the control of the displaying unit 102. The display information management unit 103 generates an image by superimposing a layout and information on the video image acquired from the surveillance camera 2 via the image capturing unit 101.

The operation accepting unit 104 accepts an instruction or the like issued by an observer via the operation apparatus 4. The operation apparatus 4 includes a switch, a touch panel, and the like. When the operation apparatus 4 is operated by the observer, an instruction or the like corresponding to an operation performed by the observer is input to the operation accepting unit 104. The operation accepting unit 104 sends the accepted instruction or the like to the control unit 100. The control unit 100 receives the instruction or the like from the operation accepting unit 104, and performs processing according to the instruction or the like. Note that the operation apparatus 4 may include a pointing device such as a mouse or a trackball.

The recording unit 105 sequentially records the video images acquired from the surveillance camera 2 via the image capturing unit 101 in the storage 13 together with metadata such as imaging time and imaging conditions. The storage 13 according to the present embodiment is a storage medium, such as a hard disk or SSD (Solid State Drive), allowed to be directly attached to the surveillance apparatus 1. The storage 13 may also be realized by a storage apparatus on a network such as NAS (Network Attached Storage) or SAN (Storage Area Network).

The abnormality detection unit 106 detects an abnormality of a human body or a moving object and an occurrence location thereof from the video image acquired from the surveillance camera 2 via the image capturing unit 101. The attention period determination unit 107 determines the attention period based on the period from the start time to the end time of the detected abnormality based on the abnormality detection result by the abnormality detection unit 106.

Figure 2A:
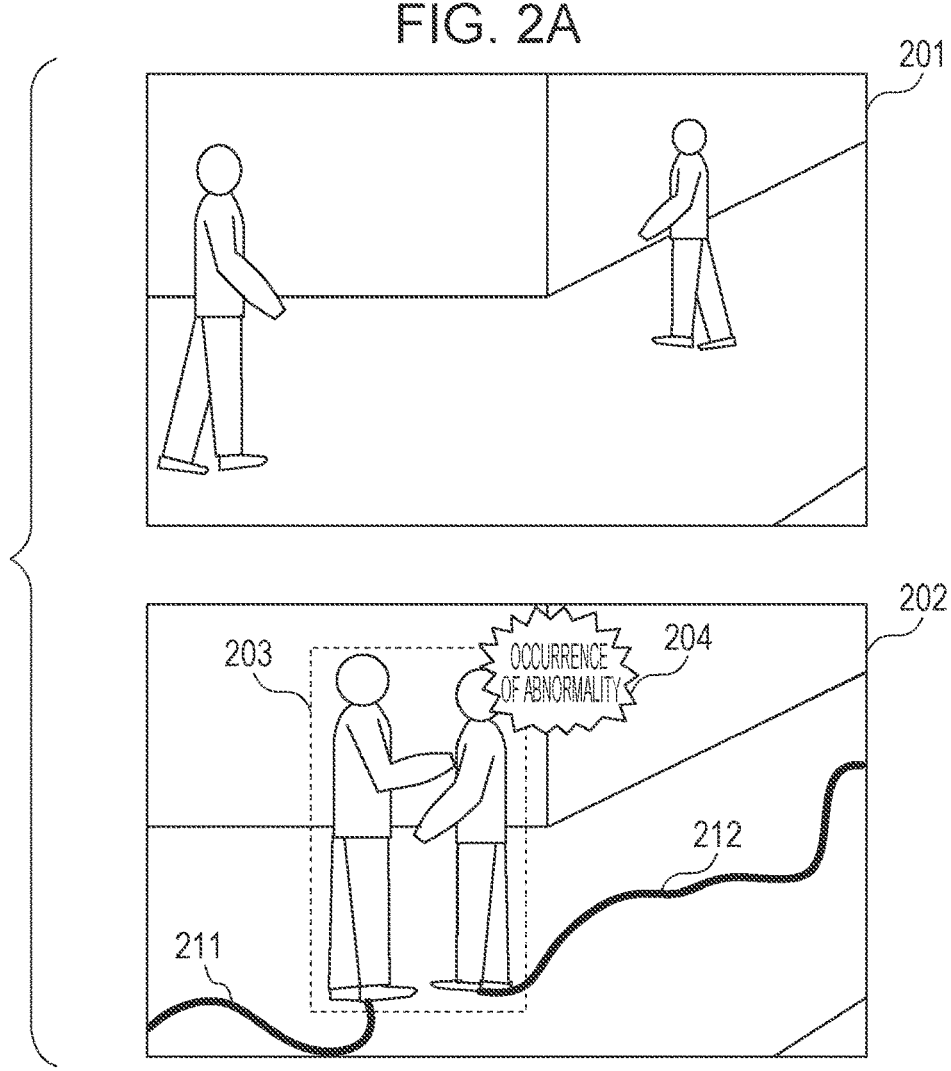
FIG. 2A is a diagram illustrating an image.
Figure 2B:
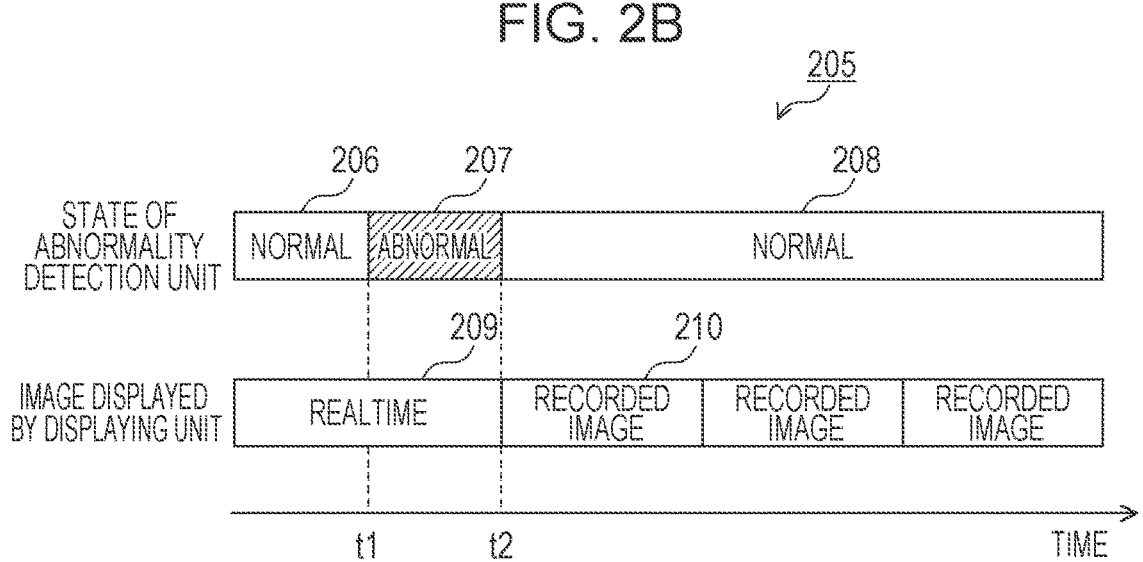
FIG. 2B is a diagram illustrating an image.

FIG. 2 is a diagram illustrating images displayed on the display 3. Images 201 and 202 shown in FIG. 2A are images generated by the display information management unit 103 based on video images acquired by the image capturing unit 101 from the surveillance camera 2. FIG. 2B illustrates a timeline 205 of a time when an abnormality is detected.

The image 201 represents an image in normal states 206 and 208, that is, states in which no abnormality is detected by the abnormality detection unit 106. Note that the image 201 is identical to an original image acquired by the image capturing unit 101 from the surveillance camera 2.

The image 202 is an image in an abnormal state 207 in which an abnormality is detected by the abnormality detection unit 106. In the image 202, an abnormality occurrence area 203 and a warning indication 204 are superimposed on the video image acquired by the image capturing unit 101 from the surveillance camera 2. When the abnormality detection unit 106 detects the abnormal state 207, the display information management unit 103 generates the image 202 by superimposing the abnormality occurrence area 203 and the warning indication 204 on the video image acquired by the image capturing unit 101 from the surveillance camera 2. The attention period determination unit 107 determines an attention period based on the start time and the end time of the abnormality detected by the abnormality detection unit 106.

Note that the abnormality detection unit 106 always performs a person frame detection operation to detect a person frame indicating a position of each person in the video image. When the abnormality detection unit 106 detects an abnormal state, the display information management unit 103 superimposes, on the video image, trajectories 211 and 212 along which persons have moved based on detected person frames.

A timeline around a time when an abnormality is detected is described below. Until time t1, no abnormality has been detected by the abnormality detection unit 106. Therefore, the displaying unit 102 displays, on the display 3, a video image acquired by the image capturing unit 101 from the surveillance camera 2 in real time such that the video image is displayed as it its. Hereinafter, an image acquired from the surveillance camera 2 and displayed in real time is denoted as a real-time video image 209.

When the abnormality detection unit 106 detects an abnormality at time t1, the attention period determination unit 107 starts measuring an attention period. The displaying unit 102 continues to display the real-time video image 209. Displaying the real-time video image 209 makes it possible for the observer to visually recognize the state of the currently occurring abnormality on the display 3.

When the abnormality detected by the abnormality detection unit 106 ends at time t2, the attention period determination unit 107 ends measuring the attention period. The attention period determination unit 107 acquires a recorded video image 210 with a length corresponding to the attention period from the video image recorded in the recording unit 105, and the displaying unit 102 plays back the recorded video image 210 on the display 3. After time t2, the displaying unit 102 repeatedly plays back the recorded video image 210 recorded in the attention period. This makes it possible for the observer to check the state of the abnormality by watching the recorded video image 210 even in a case where the real-time video image 209 does not indicate the abnormality. Since the recorded video image is played back after the abnormality ends, the playback of the recorded video image does not disturb watching by the observer when an abnormality is occurring in real time.

Figure 3:
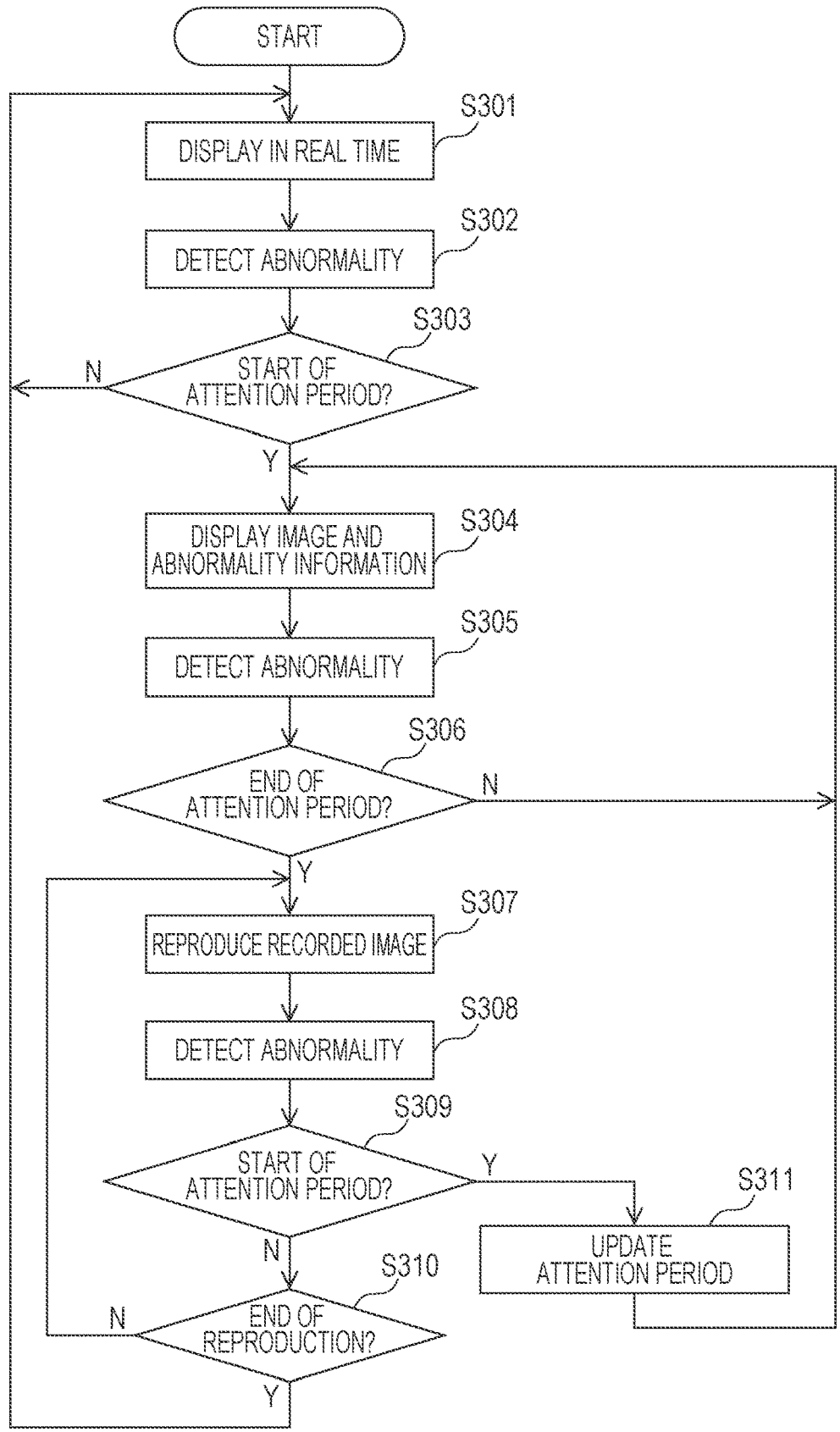
FIG. 3 is a flow chart illustrating a surveillance process.

FIG. 3 is a flow chart illustrating a surveillance process performed by the surveillance system. This process is always performed repeatedly when the surveillance system is in operation. This process ends when the surveillance system shuts down. The surveillance apparatus 1 uses the image capturing unit 101 to constantly acquire a video image from the surveillance camera 2 while the surveillance system is operating. The control unit 100 records, in the recording unit 105, the video image acquired from the surveillance camera 2 via the image capturing unit 101.

When the surveillance system is operating, the control unit 100 controls the display information management unit 103 to display the video image acquired by the image capturing unit 101 from the surveillance camera 2 on the display 3 in real time via the displaying unit 102 (S301). In a normal state in which no abnormality is occurring, the video image captured by the surveillance camera 2 is directly displayed on the display 3 as it is. The control unit 100 controls the abnormality detection unit 106 to detect an occurrence of an abnormality by analyzing the video image being displayed in real time (S302).

Figure 4:
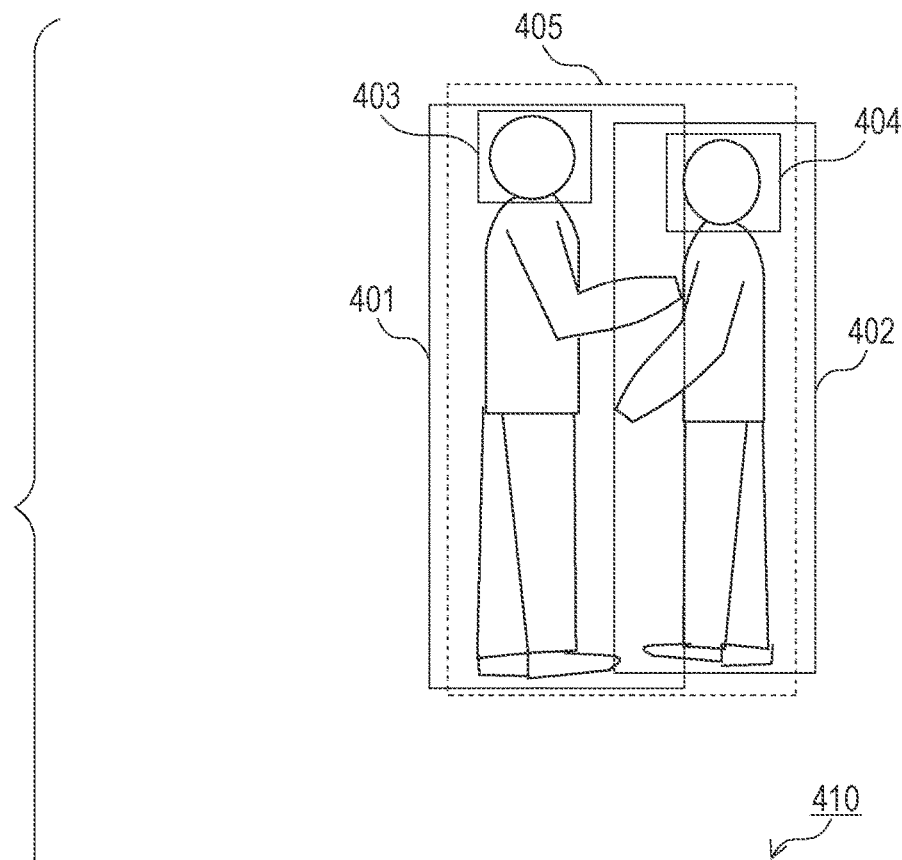
FIG. 4 is a diagram illustrating a manner of detecting an abnormality.

FIG. 4 is a diagram illustrating a manner of detecting an abnormality by the abnormality detection unit 106. The abnormality detection unit 106 always performs a person frame detection operation to detect person frames 401 and 402 indicating locations of persons or moving objects as specific subjects in the video image, and detects an abnormality by determining the degree of abnormality for each of the person frames 401 and 402. Table 410 illustrates, by way of example, information records associated with person frames 401 and 402.

The person frames 401 and 402 are represented by rectangles in the video image. The abnormality detection unit 106 detects a width, a height, and center coordinates of each of the person frames 401 and 402 in the video image for each person. Note that the abnormality detection unit 106 may detect other parameters indicating each person frame as long as they uniquely represent the rectangles of the person frames 401 and 402 in the video image. For example, the coordinates of the upper left corner or the lower right corner may be used instead of the center coordinates, and the coordinates of two diagonal points such as the upper left corner and the lower right corner may be used in stead of the width and the height. The person frames 401 and 402 may be represented by polygons, ellipses, spline closed curves, or the like instead of rectangles. The person frames 401 and 402 are accompanied respectively by rectangles 403 and 404 indicating head positions. The abnormality detection unit 106 detects the head positions in the person frames 401 and 402 using the rectangles 403 and 404.

The abnormality detection unit 106 derives a degree of abnormality for each of the person frames 401 and 402 using a known method. For example, the degree of abnormality may be derived by a k-nearest neighbor method described in "V. Saligrama, et al. Video Anomaly Detection Based on Local Statistical Aggregates, CVPR2012". The abnormality detection unit 106 derives the degree of abnormality by a technique such as multiplying a neighborhood distance by an appropriate coefficient based on the k-nearest neighbor method. The degree of abnormality is, for example, a numerical value indicating the degree of abnormality such that the higher the value, the higher the probability of being abnormal. When the degree of abnormality is higher than a predetermined threshold value, the abnormality detection unit 106 determines that an abnormality is detected. In addition, the abnormality detection unit 106 estimates a type of abnormality and determines the estimated abnormality type.

The abnormality detection unit 106 detects an occurrence of an abnormality based on information and a positional relationship among the plurality of person frames 401 and 402 and the rectangles 403 and 404. In the example illustrated in FIG. 4, the abnormality detection unit 106 determines that an abnormality classified as violence is occurring in the frame 405. To determine abnormalities, a known method may be used. For example, DBN described in "Loy, S. Gong, et al. Detecting and discriminating behavioral anomalies, Pattern Recognition 2011" may be used. DBN stands for a dynamic Bayesian network. The abnormality detection unit 106 sequentially records abnormality detection results in the recording unit 105 in association with video images.

The control unit 100 controls the attention period determination unit 107 to determine the start time of the attention period based on results of the abnormality detection performed by the abnormality detection unit 106 (S303). In a case where it is determined that it is not the start time of the attention period (S303: N), the attention period determination unit 107 does not start measuring the attention period. In this case, the control unit 100 returns to the process in S301. In a case where it is determined that it is the start time of the attention period (S303: Y), the attention period determination unit 107 starts measuring the attention period. Details of the determination process of the start time of the attention period will be described later.

When the measurement of the attention period is started, the control unit 100 controls the display information management unit 103 to generate an image in a period in which the abnormality is being detected, and the control unit 100 controls the displaying unit 102 to display the generated image on the display 3 (S304). The display information management unit 103 generates an image, which is displayed when the abnormality is detected, such that the information representing the abnormality detected by the abnormality detection unit 106 is superimposed on the real-time video image acquired by the imaging unit 101 from the surveillance camera 2. After displaying the image of the detected abnormality, the control unit 100 controls the abnormality detection unit 106 to perform an abnormality occurrence determination process in a similar manner as the process in S302 (S305).

The control unit 100 controls the attention period determination unit 107 to determine the end time of the attention period based on the result of the abnormality detection performed in S305 by the abnormality detection unit 106 (S306). In a case where it is determined that it is not the end time of the attention period (S306: N), the attention period determination unit 107 continues to measure the attention period. In this case, the control unit 100 returns to the process of S304 and controls the display 3 to display the image in the abnormality-occurrence mode. The display information management unit 103 generates the image in the abnormality-occurrence mode such that information representing the abnormality detected by the abnormality detection unit 106 in the processes in S302 and S305 is superimposed on the real-time video image acquired by the image capturing unit 101 from the surveillance camera 2.

On the other hand, in a case where it is determined that it is the end time of the attention period (S306: Y), the attention period determination unit 107 ends the measurement of the attention period.

Figure 5:
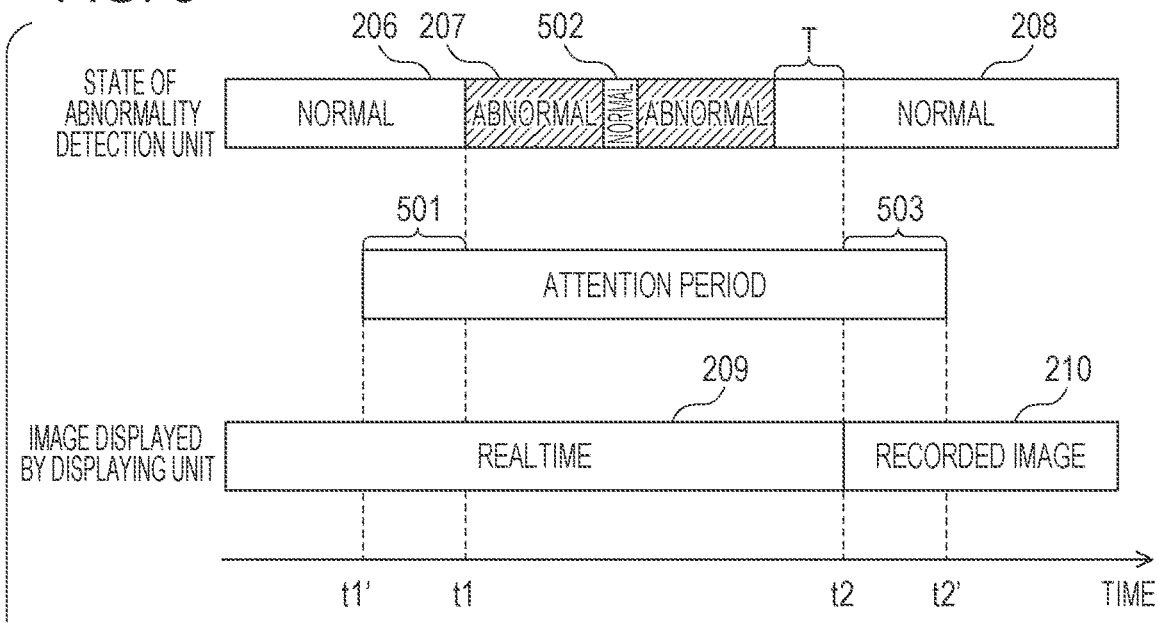
FIG. 5 is a diagram illustrating a process of determining a start time and an end time of an attention period.
Figure 5:
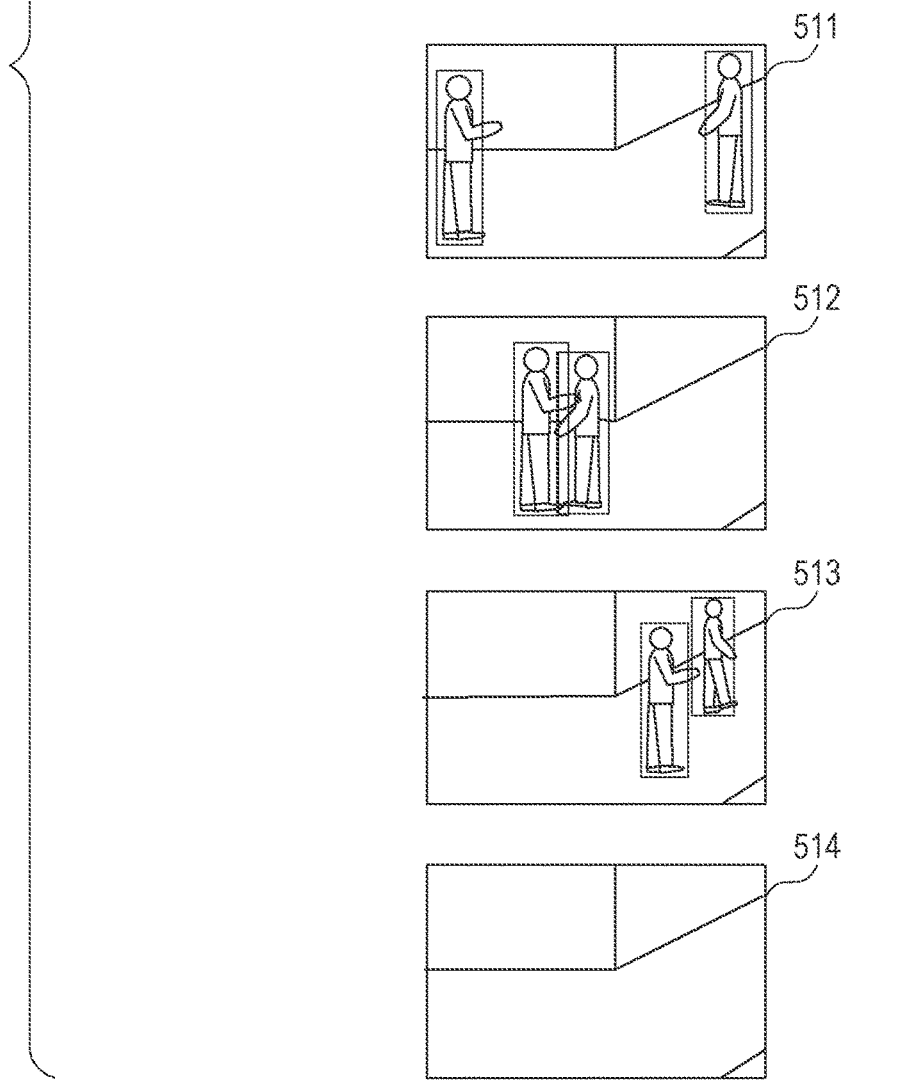

FIG. 5 is a diagram illustrating a process performed by the attention period determination unit 107 to determine a start time and an end time of an attention period. Note that the process performed by the attention period determination unit 107 is not limited to that described below. For example, a start time of an attention period may be simply given by a time when an abnormality detection result indicates an occurrence of an abnormality, and an end time of the attention period may be simply given by a time when an abnormality detection result indicates no occurrence of an abnormality.

In a case where the abnormality detection unit 106 detects an abnormality at time t1, the attention period determination unit 107 sets the start time of the attention period to time t1' before time t1. A time difference 501 between time t1 and time t1' is provided as a margin allowing the observer to check also a situation before and after the abnormality. When the abnormality occurs, that is, at time t1, the image capturing unit 101 acquires a video image 512. That is, the abnormality detection unit 106 detects the occurrence of the abnormality from the video image 512. The attention period determination unit 107 tracks back a person frame in the video image 512 used in detecting the abnormality by the abnormality detection unit 106 to detect time at which in which a person involved in the abnormality was captured for the first time in a video image 511 by the surveillance camera 2. The attention period determination unit 107 employs this detected time as the time t1'. That is, the attention period determination unit 107 incorporates a period from time t1' to time t1 into the attention period as a video image related to the immediately following abnormality although the abnormality itself is not detected in this period. As a method for tracking the person frame, a known moving object tracking method may be used.

As long as the abnormality detection unit 106 continuously detects the abnormality started at time t1, the attention period determination unit 107 determines that the attention period still continues. Note that in a case where the detection of the abnormality is interrupted for a short period smaller than a threshold value T, as in a period 502, the attention period determination unit 107 ignores the interruption and determines that the abnormality is still continuously detected.

When at time t2, a period in which the interruption of abnormality continues reaches a value longer than the threshold value T, the control unit 100 starts playback of the recorded video image 210 recorded in the attention period starting from time t1' on the displaying unit 102. However, the attention period determination unit 107 sets the end time t2' of the attention period such that the end time t2' is delayed from time t2 by a time difference 503. The provision of the time difference 503 causes the situation to advance from a video image 513 to a video image 514. The end time t2' of the attention period is a time at which the person frame related to the abnormality detected by the abnormality detection unit 106 disappears from the video image as in the video image 514 in which the person frame displayed in the video image 513 is no longer displayed.

By determining the attention period in the manner described above, the observer can detect not only an abnormality in a period in which the abnormality is detected but a series of abnormalities in a period in which the person involved in the abnormality is continuously present in the video image captured by the surveillance camera 2. Depending on the movement of the person frame, the time difference 501 or 503 may be too long. To handle this, the attention period determination unit 107 may determine the attention period such that when a period corresponding to the time difference exceeds a predetermined length, for example, 10 seconds, or one fifth of the duration of the abnormality from time t1 to time t2, the tracking of the person frame is stopped and the start time t1' and the end time t2' of the attention period are determined.

After the attention period is determined via the process described above, the control unit 100 controls the display information management unit 103 such that the recorded video image recorded in the attention period in which the abnormality was detected is played back on the display 3 via the displaying unit 102 (S307). The display information management unit 103 extracts the video image recorded in the attention period from video images sequentially recorded in the recording unit 105, and plays back the extracted video image. Note that after the playback is completed, the displaying unit 102 repeatedly performs playback of the same recorded video image recorded in the attention period.

The control unit 100 controls the abnormality detection unit 106 to detect an occurrence of an abnormality in a similar manner to the process in S302 (S308). The control unit 100 controls the attention period determination unit 107 to determine the start time of the attention period based on the results of the abnormality detection in S308 performed by the abnormality detection unit 106 (S309).

In a case where it is determined that it is not the start time of the attention period (S309: N), that is, in a case where no new abnormality has occurred, the attention period determination unit 107 does not measure the attention period. In a case where the attention period is not measured, the control unit 100 determines whether or not an instruction to end the playback of the recorded video image is input from the operation apparatus 4 via the operation accepting unit 104 (S310). In a case where the playback end instruction has not been input (S310: N), the control unit 100 returns to the process in S307 and repeats the playback of the recorded video image recorded in the attention period. In a case where the playback end instruction is input (S310: Y), the control unit 100 returns to the process in S301 and starts displaying a real-time video image. The observer may issue the playback end instruction by operating a button of the operation apparatus 4, performing a touch panel operation, performing a voice input operation, performing a gesture input operation, or performing an eye-controlled input operation. The playback end instruction may be input in response to detecting, by the surveillance apparatus 1, leaving of the observer from the display 3 or entering of the observer into an image capturing area of the surveillance camera 2.

In a case where it is determined that it is the start time of the attention period (S309: Y), the attention period determination unit 107 determines that a new abnormality has occurred, and starts measuring the attention period. The attention period determination unit 107 updates the attention period based on the immediately previous attention period used in the playback of the recorded video image and the start time determined in the process in S309 (S311).

In a case where the time difference between the start time of the new attention period and the end time of the immediately previous attention period is less than a predetermined time (the threshold value T), for example, less than 10 seconds, the attention period determination unit 107 determines that the new attention period belongs to the previous attention period. That is, the attention period determination unit 107 employs the start time of the immediately previous attention period as the start time of the new attention period. After updating the attention period, the control unit 100 returns to the process of S304.

In a case where the time difference between the start time of the new attention period and the end time of the immediately previous attention period is equal to or greater than a predetermined value (the threshold value T), for example, 10 seconds or more, the attention period determination unit 107 determines that a new attention period has started. That is, the attention period determination unit 107 sets the start time determined in the process in S309 as the start time of the new attention period related to a new abnormality. After updating the attention period, the control unit 100 returns to the process in S304.

As a result of performing the process in the above-described manner by the attention period determination unit 107, when abnormalities occur sequentially in a short time, these abnormalities are treated as a series of related abnormalities, and the recorded video image from the start of the series of related abnormalities is provided to the observer.

As described above, the surveillance system realizes the operation described above with reference to FIG. 2 thereby making it possible to reduce the possibility for the observer to overlook an occurrence of an abnormality when the abnormality occurs without causing any problem to occur in grasping the current situation by the observer when an abnormality occurs. Thus, when an abnormality occurs, the surveillance apparatus 1 properly determines the attention period and plays back the recorded video image repeatedly thereby making it possible for the observer to correctly recognize the occurrence of the abnormality.

Second Embodiment

In the surveillance system according to the first embodiment, when a recorded video image recorded in an attention period is played back, a real-time video image is replaced by the recorded video image. However, when an observer is performing surveillance, the observer may compare the real-time video image with a recorded video image recorded when an abnormality occurred in the past. In the surveillance system according to a second embodiment, a recorded video image recorded in an attention period and a real-time video image are both displayed on the display 3 simultaneously. The hardware configuration of the surveillance system according to the second embodiment is the same as that according to the first embodiment, and thus a description thereof is omitted.

Figure 6:
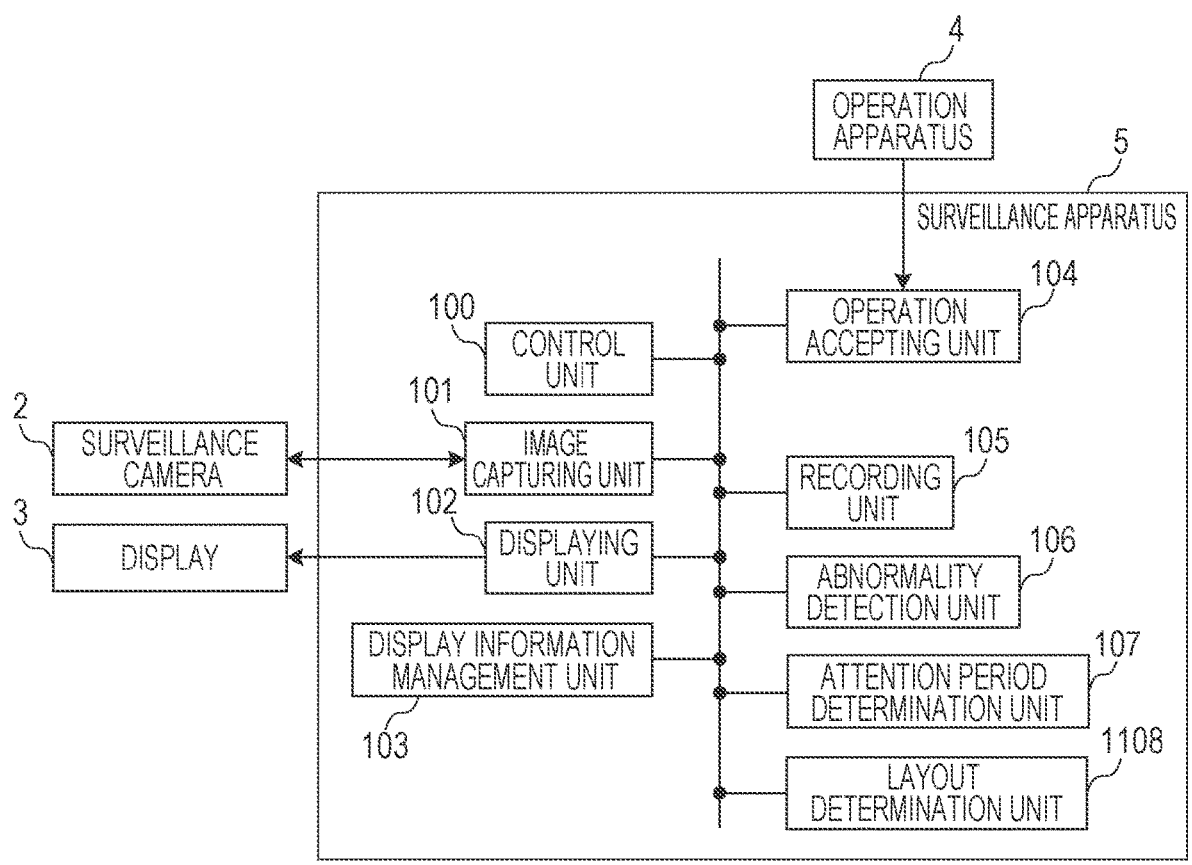
FIG. 6 is a functional block diagram of a surveillance apparatus.

FIG. 6 is a functional block diagram of the surveillance apparatus according to the second embodiment. The surveillance apparatus 5 has a function of a layout determination unit 1108 in addition to the functional blocks of the surveillance apparatus 1 shown in FIG. 1B. The description of the same functions as those which have been already described is omitted. The layout determination unit 1108 determines the layout in which a recorded video image recorded in an attention period and a real-time video image are displayed on the display 3 by the display information management unit 103. The display information management unit 103 generates an image in which the recorded video image and the real-time video image are combined according to the determination by the layout determination unit 1108, and displays the resultant image on the display 3 via the displaying unit 102.

Figure 7:
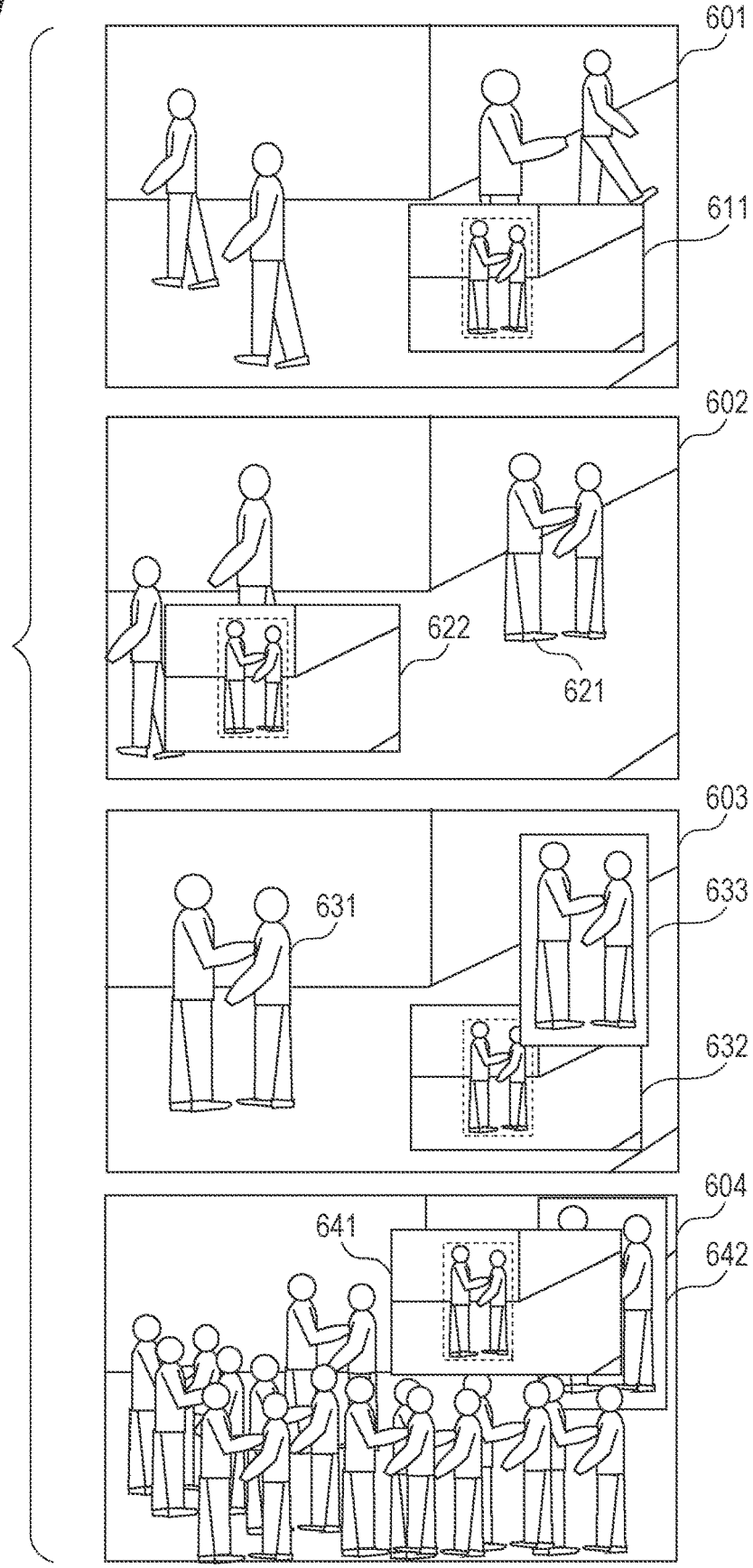
FIG. 7 is a diagram illustrating a layout of a recorded video image and a realtime image.

FIG. 7 is a diagram illustrating a layout of a recorded video image and a real-time video image. Images 601 to 604 are examples of layouts in which recorded video images and real-time video images are combined according to determinations made by the layout determining unit 1108. The layout determination unit 1108 determines one of the real-time video image and the recorded video image as a background video image and the other as a video image to be displayed in a small window.

The image 601 is an image as of an end time of an attention period, and corresponds to the image at time t2 in FIG. 2. In the image 601, a recorded video image recorded in an attention period is displayed in a small window 611 so as to be superimposed on a real-time video image. The observer can check a current state of a site after an abnormal was over by watching the real-time video image while checking the state of the abnormality that occurred just before the present by watching the small window 611 in the image 601. The displaying method described above is useful for simultaneously displaying a recorded video image and a real-time video image recorded in an attention period on a small screen such that of a smartphone or a tablet device. Since a part of the real-time video image hidden behind the small window 611, the displaying position of the small window 611 on the real-time video image is controlled so as not to make it difficult to check the abnormality that has occurred.

The image 602 is an image in which a new abnormality 621 occurs in a real-time video image on which a recorded video image recorded in an attention period is superimposed. A small window 622 for displaying the recorded video image recorded in the attention period is moved to a location so as not to hide the occurrence position of the abnormality 621 in the real-time video image. Even when the small window 622 is moved to a position that does not hide the abnormality 621 occurring as shown in the image 602, if a new abnormality occurs, or the occurrence location of the abnormality 621 changes or the small window 622 is moved by the observer or for other reasons, there is a possibility that the location of the occurrence of the abnormality is hidden behind the small window 622. The image 603 is an image in which another new abnormality 633 occurs after a small window 632 is moved in response to an occurrence of an abnormality 631. The small window 632 is superimposed on the real-time video image, but a part of the small window 632 is hidden behind an area where the abnormality 633 is occurring.

The image 604 is an image in which many abnormalities occur. When a large number of abnormalities are detected over the whole image, if it is inevitable to hide some abnormalities behind the small window, an abnormality with as small a degree of abnormality as possibly is selected as an abnormality at an occurrence position 642 hidden behind the small window 641.

In each of the examples of layouts in the images 601 to 604, a small window and a background image are displayed in the display screen of the same display 3 such that a recorded video image recorded in an attention period is displayed in the small window and superimposed on the background where the real-time video image is displayed.

However, the layouts are not limited to these examples. A plurality of displays may be provided and a real-time video image and a small window may be displayed separately on different display screens. For example, a small window may be displayed in cooperation with a display screen of a mobile device such as a smartphone.

Figure 8:
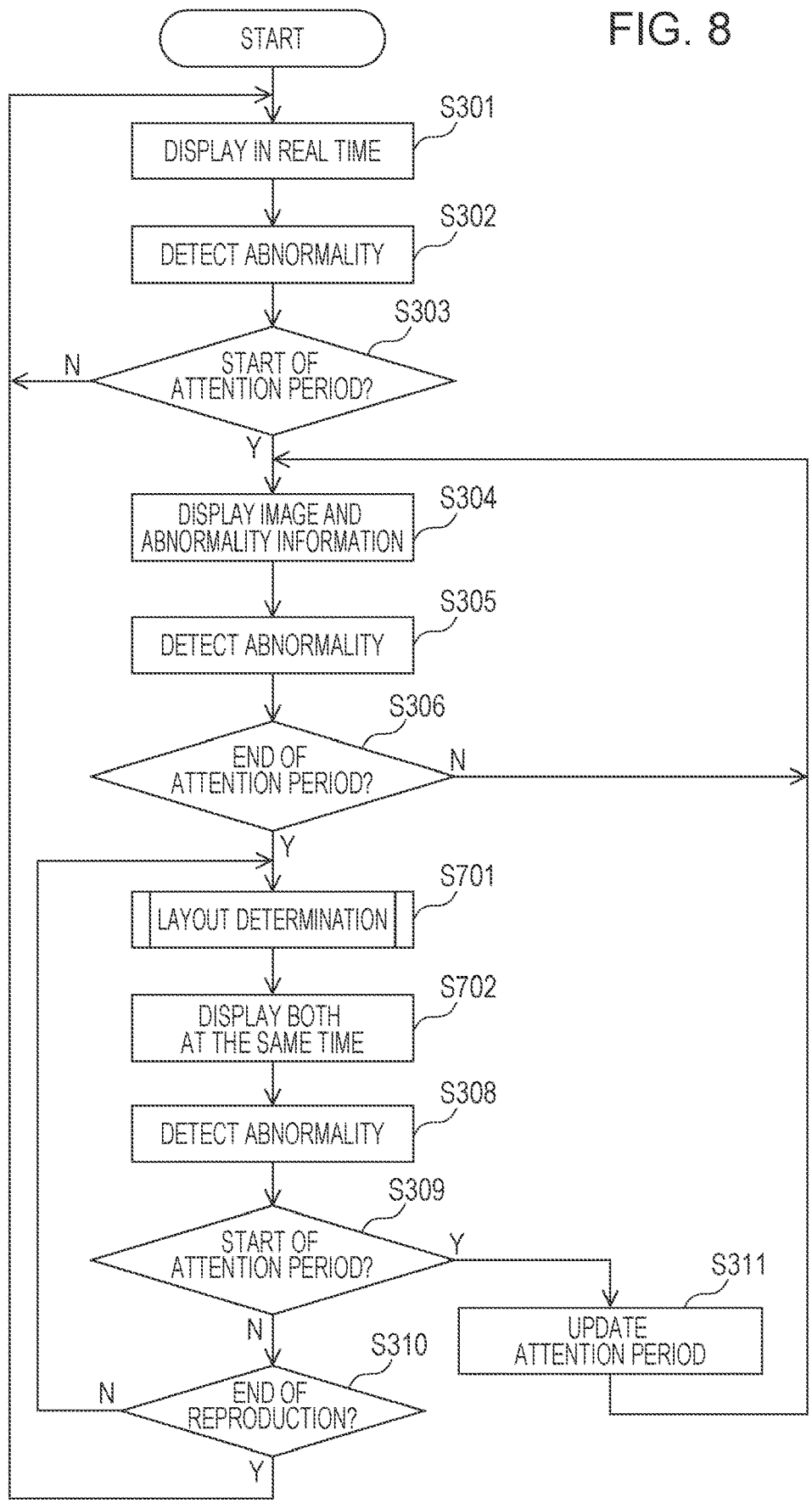
FIG. 8 is a flow chart illustrating a surveillance process.

FIG. 8 is a flow chart showing a surveillance process by the surveillance system according to the second embodiment. The same steps as those in the surveillance process according to the first embodiment shown in FIG. 3 are denoted by the same step numbers. Descriptions of the same processes are omitted.

In a case where the attention period determination unit 107 determines that it is the end time of an attention period and ends the measurement of the attention period (S306: Y), or in a case where an instruction to end the playback of the recorded video image is not input via the operation apparatus 4 (S310: N), the control unit 100 determines the image layout. The layout of images to be displayed on the display 3 is determined by the display information management unit 103 and the layout determination unit 1108. The control unit 100 controls the displaying unit 102 to simultaneously display the recorded video image recorded in the attention period and the real-time video image on the display 3 according to the determined layout (S702). The process after displaying the recorded video image and the real-time video image is performed in the same manner as the processes after S308 in FIG. 3.

Figure 9:
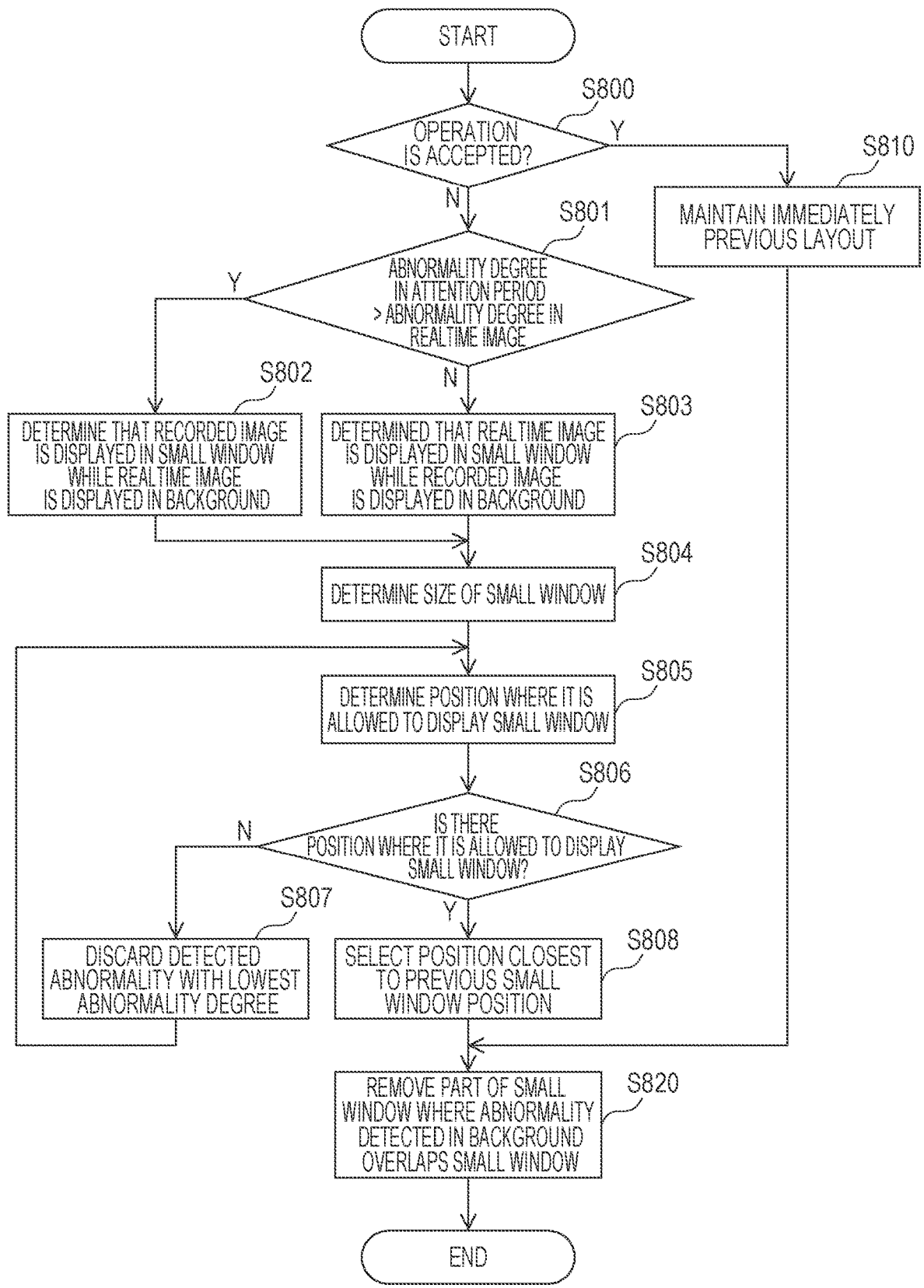
FIG. 9 is a flow chart illustrating a process of determining a layout.

FIG. 9 is a flow chart showing the image layout determination process in S701.

The control unit 100 determines whether or not the operation accepting unit 104 has accepted an operation for determining a layout by the observer via the operation apparatus 4 (S800). The observer may use the touch panel of the operation apparatus 4 to determine the position and the size of the small window, and may use a toggle switch to select which one of the recorded video image recorded in the attention period and the real-time video image is to be displayed in the small window. When an operation for determining the layout is accepted (S800: Y), the control unit 100 maintains the previous layout for displaying the image in the layout desired by the observer by the display information management unit 103 (S810). In a case where an operation for determining the layout is not accepted (S800: N), the control unit 100 proceeds to a process to automatically determine the layout. Note that, also in a case where the layout determination process is performed for the first time after the end of the measurement of the attention period, the control unit 100 proceeds to the process to automatically determine the layout. Details of the layout determination operation by the observer will be described later.

In the case where the layout is automatically determined, the control unit 100 compares, using the display information management unit 103, the degree of abnormality at the current playback position of the recorded video image recorded in the attention period time and the degree of abnormality of the video image captured by the surveillance camera 2 in real time (S801). The display information management unit 103 calculates the sums of the values indicating degrees of the abnormalities detected by the abnormality detection unit 106 for the respective video images and compares them. In a case where the degree of abnormality of the recorded video image recorded in the attention period is higher than the abnormality degree of the real-time video image (S801: Y), the layout determination unit 1108 determines that the recorded video image recorded in the attention period is to be displayed in the small window and the real-time video image is to be displayed on the background (S802). In a case where the degree of abnormality of the real-time video image is higher than the degree of abnormality of the recorded video image recorded in attention period (S801: N), the layout determination unit 1108 determines that the recorded video image recorded in the attention period is to be displayed on the background and the real-time video image is to be displayed in the small window (S803). That is, the video image with the higher degree of abnormality is displayed in the small window on the foreground to make it easier to watch it with attention. However, the present invention is not limited to this, but the displaying in the small window may be determined in other manners. For example, the recorded video image recorded in the attention period may be always displayed in a small window, or the image displayed in the small window may be switched by the operation by the observer.

The layout determination unit 1108 determines the size of the small window (S804). In this process, the video image displayed in the small window is reduced so that the short side of the small window in which the video image with the highest degree of abnormality is displayed has a predetermined length, for example, 50 pixels. Note that a restriction is imposed on the size of the small window such that the upper limits of the height and the width are half the height and width of the background image, and the lower limits are one-fourth. Note that the determination of the size of the small window is not limited to the example described above, but the size may be determined in other manners.

The display information management unit 103 derives a position where the small window is allowed to be displayed without hiding an abnormality being detected in the background video image by the abnormality detection unit 106 (S805). In the deriving of the position where the small window is allowed to be displayed, in a case where the position of the immediately previous small window does not hide the abnormality being detected in the background video image, the display information management unit 103 employs this position. However, in a case where the position of the immediately previous small window hides the abnormality being detected in the background video image, the position at which the average distance from the all abnormalities being detected in the background video image has a maximum value is employed as the position where the small window is allowed to be displayed.

In a case where the display information management unit 103 cannot derive any position where the small window is allowed to be displayed (S806: N), the control unit 100 controls the display information management unit 103 to discard an abnormality with a lowest degree of abnormality detected in the background video image (S807). Thereafter, the display information management unit 103 again derives a position where the small window is allowed to be displayed (S805). The control unit 100 performs the processes of S805 to S807 repeatedly while discarding the abnormality with the lowest degree of abnormality detected in the background video image thereby acquiring the position where the small window is allowed to be displayed.

In a case where the display information management unit 103 successfully derives positions where the small window is allowed to be displayed (S806: Y), the control unit 100 selects a position from the positions derived by the display information management unit 103 where the small window is allowed to be displayed such that the position closest to the previous position of the small window is selected. In a case where there is only one allowable position, the display information management unit 103 selects it. In particular, in a case where the previous position of the small window does not hide any abnormality detected in the background video image, the display information management unit 103 selects the previous position as it is. In this case, it is possible to prevent the small window from moving greatly which may result in a problem in visual recognition. The control unit 100 controls the display information management unit 103 to remove a portion of the small window overlapping an area of an abnormality detected in the background video image such that the area of abnormality detected in the background video image is not hidden behind the small window (S820).

As described above, the display information management unit 103 and the layout determination unit 1108 determine the displaying position of the small window so that the small window does not interfere with the background video image.

Figure 10:
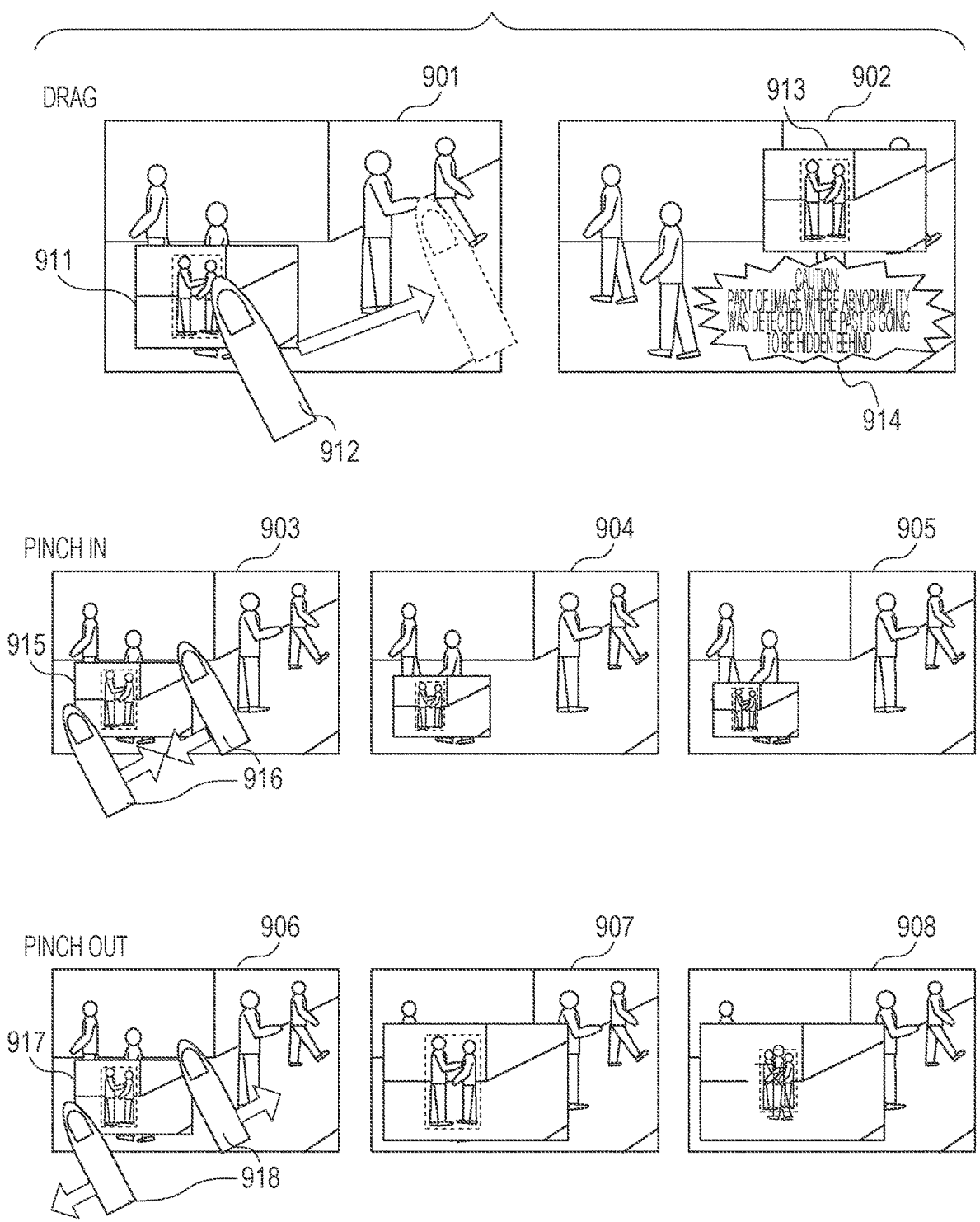
FIG. 10 is a diagram illustrating an operation process of determining a layout.

FIG. 10 is a diagram illustrating a layout determination operation process by an observer using the operation apparatus 4 in S800. The observer can determine the layout in terms of the position of the small window, the size of the small window, and which one of the recorded video image recorded in the attention period and the real-time video image is to be displayed in the small window. The specified layout is maintained according to the instruction given by the observer.

The position of the small window may be determined by the observer by, when the image 901 is displayed on the display 3, dragging the small window 911 on the touch panel of the operation apparatus 4 with a finger 912 and moving it to the position of the small window 913 in the image 902. When the process described above is performed, if an abnormality detected in the past overlaps the position of the small window, the display information management unit 103 displays a warning image 914 thereby warning the observer.

The size of the small window is determined by the observer by pinching in or pinching out the small window on the touch panel of the operation apparatus 4. When the image 903 is displayed on the display 3, if the observer performs pinching-in 916 on the small window 915, then, in a case where the recorded video image recorded in the attention period is displayed in the small window 915, the display information management unit 103 determines whether an abnormality is being detected in the video image in the small window 915. In a case where there is an abnormality detected, the display information management unit 103 performs trimming on the video image in the small window around the position where the abnormality is detected as in an image 904. When there is no abnormality being detected, the display information management unit 103 reduces the total size of the small window and displays it as in an image 905.

When the image 906 is displayed on the display 3, if the observer performs pinching-out 918 on the small window 917, then, in a case where the recorded video image recorded in the attention period is displayed in the small window 917, the display information management unit 103 determines whether there is an abnormality being detected in the video image in the small window 917. When there is an abnormality being detected, the display information management unit 103 enlarges the total size of the small window and displays it as in an image 907. When there is no abnormality being detected, the display information management unit 103 enlarges the trimming area about the center of the abnormality as in an image 908. That is, the display information management unit 103 changes the operation of changing the size of the small windows 915 and 917 based on the detection result of the abnormality in the video images displayed in the small windows 915 and 917.

For example, when a recorded video image including an abnormality being detected is displayed in a small window, the image layout such as that described above is employed to make an emphasis on the abnormality being detected assuming that the observer wants to particularly check the abnormality. Whether the recorded video image recorded in the attention period or the real-time video image is displayed in the small window can be switched, for example, by operating a toggle switch of the operation apparatus 4 by the observer. The toggle switch may be a physical switch or a virtual switch on the touch panel.

As described above, the surveillance system is capable of simultaneously displaying the recorded video image recorded in the attention period and the real-time video image on the display 3 so as to show the images to the observer. Thus, when an abnormality occurs, the surveillance system can reduce the possibility for the observer to overlook the occurrence of the abnormality without causing any problem in grasping the current state when an abnormality occurs. Thus, in the surveillance apparatus 5, it is ensured that the observer can realize an occurrence of an abnormality when it occurs.

Third Embodiment

According to a third embodiment, a surveillance system includes a plurality of surveillance cameras 2. The surveillance apparatus 1 displays a video image on the display 3 while switching the video image displayed thereon among video images acquired from the plurality of surveillance cameras 2. The overall configuration of the surveillance system is the same as that shown in FIG. 1A except that the plurality of surveillance cameras 2 are provided. The plurality of surveillance cameras 2 are communicably connected to the surveillance apparatus 1 via a network such as a LAN (Local Area Network).

The image capturing unit 101 of the surveillance apparatus 1 acquires video images from some or all of the plurality of surveillance cameras 2 at the same time. The abnormality detection unit 106 detects an abnormality for each of the video images acquired from the plurality of surveillance cameras 2. The attention period determination unit 107 determines the attention period based on a combination of the abnormality detection results acquired from the plurality of video images provided by the respective surveillance cameras 2.

Figure 11:
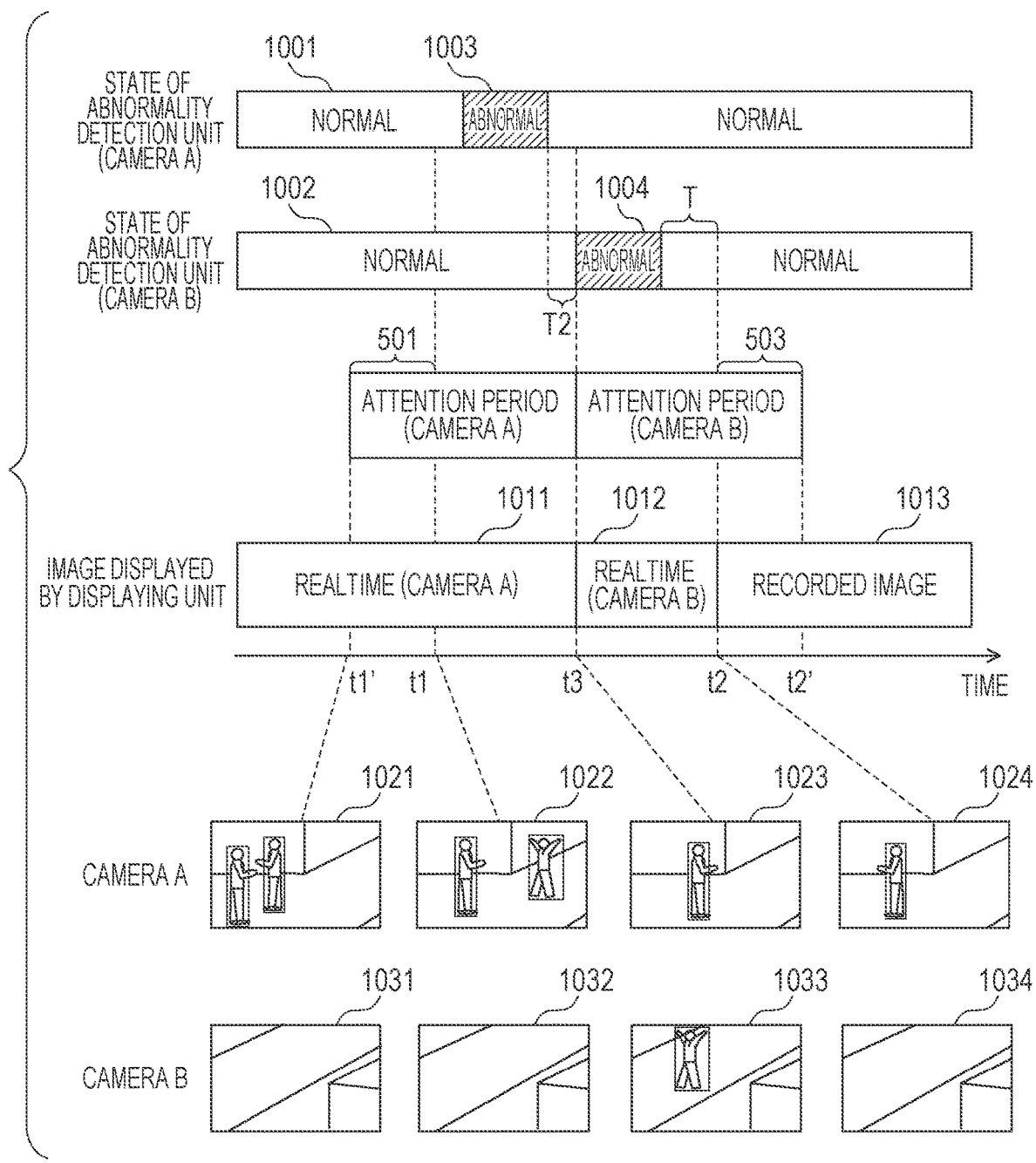
FIG. 11 is a diagram illustrating a process of determining a start time and an end time of an attention period.

FIG. 11 is a diagram illustrating a process in which the attention period determination unit 107 determines the start time and end time of the attention period. FIG. 11 illustrates a case where abnormalities occur successively in video images captured by two surveillance cameras (a camera A and a camera B).

Before time t1, the abnormality detection unit 106 detects no abnormality in the video images acquired from the camera A and the camera B, and thus the abnormality detection unit 106 determines that they are in normal states 1001 and 1002 respectively. When the abnormality detection unit 106 detects an abnormality 1003 at time t1 from the video image acquired from the camera A, the attention period determination unit 107 determines the start of the attention period. The attention period determination unit 107 sets a time difference 501 as a margin as in FIG. 5, and determines time t1' as the start time of the attention period.

In a case where the abnormality 1003 is interrupted, if an interruption period is longer than the threshold value T, the attention period determination unit 107 determines that the attention period ends. However, in a case where an abnormality 1004 is detected in the video image captured by the camera B within a period shorter than a threshold value T2 smaller than the threshold value T (T2<T), the attention period determination unit 107 determines that the attention period still continues. In this case, the attention period determination unit 107 stores time t3 at which an abnormality 1004 occurs in the video image captured by the camera B. Thereafter, the attention period determination unit 107 determines the end of the entire attention period by evaluating the interruption of the abnormality 1004. In a case where an interruption occurs at time t2 in the abnormality 1004 in the video image captured by the camera B for a period longer than the threshold value T, the attention period determination unit 107 determines that the attention period ends. In this case, as in the case shown in FIG. 5, an end time t2' is determined such that a time difference 503 is added as a margin.

The displaying unit 102 displays a video image 1011 acquired from the camera A in real time on the display 3 until time t3, and displays a video image 1012 acquired from the camera B in real time from time t3 to time t2. After time t2, the displaying unit 102 plays back a recorded video image 1013 recorded in the attention period on the display 3. The recorded video image 1013 recorded in the attention period includes the video image acquired from the camera A for the period from time t1' to time t3 and the video image acquired from the camera B for the period from time t3 to time t2'. The recorded video image 1013 is read out from the recording unit 105 and played back.

For example, the surveillance apparatus 1 detects no abnormality at time t1' in video images 1021 and 1031 respectively acquired from the cameras A and B. The surveillance apparatus 1 detects an abnormality 1003 in a video image 1022 acquired at time t from the camera A. "Snatching" is detected as the abnormality in the image 1022. The surveillance apparatus 1 detects no abnormality from a video image 1032 acquired from the camera B.

In the video image 1023 acquired by the surveillance apparatus 1 from the camera A at time t3, the snatcher escapes to the right hand side in the video image and disappears from the angle of view of the camera A. The abnormality detection unit 106 determines that the abnormality 1003 has been interrupted at this point of time. However, the escaping snatcher appears in a video image 1033 acquired by the surveillance apparatus 1 from the camera B at time t3. The abnormality detection unit 106 detects the abnormality 1004 from the video image 1033 acquired from the camera B. The surveillance apparatus 1 does not detect any abnormality in the video images 1024 and 1034 acquired from the cameras A and B at time t2 because the snatcher has disappeared also from the angle of view of the camera B. Based on the abnormalities that occurred serially from time t1 to time t2, the attention period determination unit 107 determines that the start time and the end time of the attention period are respectively time t1' and t2'.

As a result of determining the attention period in the manner described above, the recorded video image 1013, which is played back, includes the abnormality 1003 detected from the video image captured by the camera A and the following abnormality 1004 detected from the video image captured by the camera B. Thus, the observer is allowed to check the series of abnormalities without manually switching among the video images captured by the plurality of surveillance cameras (the camera A and the camera B).

In the example described above, the abnormality occurs in the video image captured by the camera B after the abnormality occurs in the video image captured by the camera A. However, the roles of the camera A and the camera B are not fixed, but they may be exchanged. Also in a case where there are three or more surveillance cameras, the method described above can be applied if the roles of camera A and camera B are assigned in the order in which abnormalities occurred. In a case where a further abnormality occurs in an image captured by a third surveillance camera, an attention period may be determined by combining abnormalities in a similar manner as described above.

The above-described process may be performed according to a flow based on the flow charts shown in FIG. 3 and FIG. 8. Because a plurality of surveillance cameras 2 are used, the process may be modified as described below.

In the processes in S301 and S304, the display information management unit 103 controls the displaying unit 102 to display video images captured by the plurality of surveillance cameras 2 on the display 3 in real time. In the process in S301, under the control of the display information management unit 103, for example, the displaying unit 102 divides the display screen of the display 3 and displays a plurality of video images in the divided screen areas, or displays the video images while cyclically switching them at regular time intervals. In the process in S304, under the control of the display information management unit 103, the displaying unit 102 displays a video image in which an abnormality is detected and abnormality information such that they are highlighted. For example, a video image in which an abnormality is detected may be displayed over a full screen area of the display 3 without dividing the screen of the display 3.

In the processes in S302, S305, and S308, the abnormality detection unit 106 performs the abnormality detection process on respective video images acquired from the surveillance cameras 2, and outputs an abnormality detection result for each video image. In the processes in S303, S306, and S309, the attention period determination unit 107 determines the start time and the end time of the attention period according to the method described above with reference to FIG. 11.

As described above, in the surveillance system, when abnormalities occur sequentially in video images captured by a plurality of surveillance cameras 2, it is determined that a series of abnormalities has occurred during an attention period, and the video image recorded in this attention period is played back thereby making it possible for the observer to correctly recognize the abnormality. Thus, when an abnormality occurs, the surveillance system can reduce the possibility for the observer to overlook the occurrence of the abnormality without causing any problem in grasping the current state when an abnormality occurs. Thus, in the surveillance apparatus 1, it is ensured that the observer can realize an occurrence of an abnormality when it occurs.

The present invention may also be implemented such that a program for realizing one or more functions of the above-described embodiments is supplied to a system or apparatus via a network or a storage medium, and the program is read and executed by one or more processors in a computer of the system or apparatus. The present invention may also be implemented using a circuit (for example, ASIC) that realizes one or more functions.

According to the present invention, a video image recorded in an attention period from a start to an end of an abnormality is displayed after detection of the abnormality ends, thereby making it possible for an observer to correctly recognize the abnormality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A surveillance apparatus comprising:
   one or more processors; and
   at least one or more memories storing executable instructions which, when executed by the one or more processors, cause the information processing device to perform operations including:
   detecting an abnormality from a recorded video image, wherein the abnormality is detected using a position of a specific subject from the recorded video image;
   determining a start time of the detecting the abnormality and an end time of the detecting the abnormality based on a period in which the specific subject involved in the abnormality is continuously present in a live video image captured by an imaging capturing apparatus;
   deciding a layout of the recorded video image and the live video image to be displayed;
   outputting, based on the layout, so as to play the recorded video image until the determined end time, and after the determined end time so as to play the recorded video image which has been captured from the start time to the end time,
   wherein the layout indicates that one of the live video image and the recorded video image is employed as a background video image and the other as a video image to be displayed in a small window, and
   the small window is superimposed on the background video image.

2. The surveillance apparatus according to claim 1, wherein executing the executable instructions causes the information processing apparatus to perform further operations including: acquiring an instruction to end the playback of the recorded video image,
   wherein the recorded video image is until the instruction is acquired.

3. The surveillance apparatus according to claim 1, wherein the specific subject is a human body or a moving object.

4. The surveillance apparatus according to claim 1, wherein a trajectory of the specific subject superimposed on the background video image.

5. The surveillance apparatus according to claim 1, wherein the abnormality is detected in a case where the abnormality is interrupted for a time shorter than a predetermined threshold value.

6. The surveillance apparatus according to claim 1, wherein a displaying position of the small window is decided based on a result of detecting of the abnormality in the background video image.

7. The surveillance apparatus according to claim 6, wherein a displaying position of the small window is decided such that among abnormalities detected in the background video image, the higher the abnormality degree of an abnormality, the lower the possibility for the abnormality to be superimposed behind the small window.

8. The surveillance apparatus according to claim 1, wherein when an abnormality is detected at a location corresponding to the displaying position of the small window, in the background image, the small window is not superimposed such that, as only exception, a part at the location where the abnormality is detected in the video image.

9. The surveillance apparatus according to claim 1, wherein executing the executable instructions causes the information processing apparatus to perform further operations including:
   accepting an operation on the small window,
   wherein the small window is output according to the operations including at least one of the following: the position of the small window; the size of the small window; and whether the recorded video image or the live video image acquired is to be displayed in the small window.

10. The surveillance apparatus according to claim 9, wherein a warning image is output if an area of the abnormality detected in the past contains the position of the small window according to the operation.

11. The surveillance apparatus according to claim 9, wherein the operation indicates for changing the size of the small window based on a result of detecting of an abnormality in a video image to be displayed in the small window.

12. The surveillance apparatus according to claim 1, wherein
   a plurality of live video images are acquired from each of a plurality of image capturing apparatuses,
   the abnormality is detected from the plurality of-live video images, and
   the start time and end time are determined based on a result of the detecting of the abnormalities from the plurality of live video images.

13. The surveillance apparatus according to claim 12, wherein
   an attention period including a period from the start time to the end time of the detecting the abnormality is at least in one of the plurality of live video images.

14. A surveillance method comprising:
   detecting an abnormality from a recorded the video image, wherein the abnormality is detected using a position of a specific subject from the recorded video image;
   determining a start time of the detecting the abnormality based on a period in which the specific subject involved in the abnormality is continuously present in a live video image captured by an imaging capturing apparatus and an end time of the detecting the abnormality;
   deciding a layout of the recorded video image and the live video image to be displayed; and
   outputting, based on the layout so as to play the recorded video image until the determined end time, and after the determined end time so as to play the recorded video image which has been captured from the start time to the end time,
   wherein the layout indicates that one of the live video image and the recorded video image is employed as a background video image and the other as a video image to be displayed in a small window, and
   the small window is superimposed on the background video image.

15. A non-transitory computer-readable storage medium storing a computer program for causing a computer to execute a surveillance method, the method comprising:

detecting an abnormality from a recorded the video image, wherein the abnormality is detected using a position of a specific subject from the recorded video image;

determining a start time of the detecting the abnormality based on a period in which the specific subject involved in the abnormality is continuously present in a live video image captured by an imaging capturing apparatus and an end time of the detecting the abnormality;

deciding a layout of the recorded video image and the live video image to be displayed; and outputting, based on the layout so as to play the recorded video image until the determined end time, and after the determined end time so as to play the recorded video image which has been captured from the start time to the end time, wherein the layout indicates that one of the live video image and the recorded video image is employed as a background video image and the other as a video image to be displayed in a small window, and the small window is superimposed on the background video image.

\* \* \* \* \*